(12) United States Patent
Steiger et al.

(10) Patent No.: US 7,318,614 B2
(45) Date of Patent: Jan. 15, 2008

(54) BULKHEAD ASSEMBLY FOR VEHICLES

(75) Inventors: William D. Steiger, Louisville, KY (US); Dale A. Panasewicz, Strongsville, OH (US); Dennis M. Futo, Strongsville, OH (US)

(73) Assignee: L&P Property Management Company, South Gate, CA (US)

( * ) Notice: Subject to any disclaimer, the term of this patent is extended or adjusted under 35 U.S.C. 154(b) by 214 days.

(21) Appl. No.: 11/210,204

(22) Filed: Aug. 23, 2005

(65) Prior Publication Data

US 2007/0046071 A1    Mar. 1, 2007

(51) Int. Cl.
*B60R 27/00* (2006.01)
(52) U.S. Cl. .................... 296/24.4; 410/121
(58) Field of Classification Search ........... 296/183.01, 296/24.4, 24.42, 24.41, 24.43; 410/121, 410/129, 140; 220/529, 553
See application file for complete search history.

(56) References Cited

U.S. PATENT DOCUMENTS

| 5,069,497 | A | 12/1991 | Clelland |
| 5,080,416 | A * | 1/1992 | Dirck ......................... 52/106 |
| 5,246,261 | A | 9/1993 | McCormack |
| 5,357,143 | A | 10/1994 | Lehr et al. |
| 5,532,521 | A | 7/1996 | Leininger |
| 5,890,329 | A * | 4/1999 | Krueger ....................... 52/106 |
| 6,142,550 | A | 11/2000 | Blyth et al. |
| 6,357,979 | B1 | 3/2002 | Montagna et al. |
| 6,470,692 | B1 | 10/2002 | Ziegler et al. |
| 6,474,713 | B1 | 11/2002 | Ruck et al. |
| 6,877,940 | B2 * | 4/2005 | Nelson et al. .............. 410/129 |
| 2003/0141731 | A1 | 7/2003 | Betts et al. |

OTHER PUBLICATIONS http://www.capworld.com/TruckAccessories/ByManufacturer/crown.htm, Sep. 22, 2005; 4 pgs.

* cited by examiner

*Primary Examiner*—Lori L. Lyjak
(74) *Attorney, Agent, or Firm*—Michael Best & Friedrich LLP

(57) ABSTRACT

A bulkhead assembly for a vehicle such as, for example, a van or truck comprises a first panel adjacent and substantially perpendicular to a street-side wall of the vehicle, a second panel adjacent and substantially perpendicular to a curb-side wall of the vehicle, and a door panel disposed between the first and second panels, the door being hingedly attached to one of the first and second panels, wherein the panels are formed from a polymer material. In one embodiment, the panel adjacent the street-side wall of the vehicle (i.e., the driver-side panel) defines a cavity extending rearwardly into the cargo area, the cavity being sized (in terms of the cavity's width) to accommodate the seat-back of the driver's seat.

30 Claims, 11 Drawing Sheets

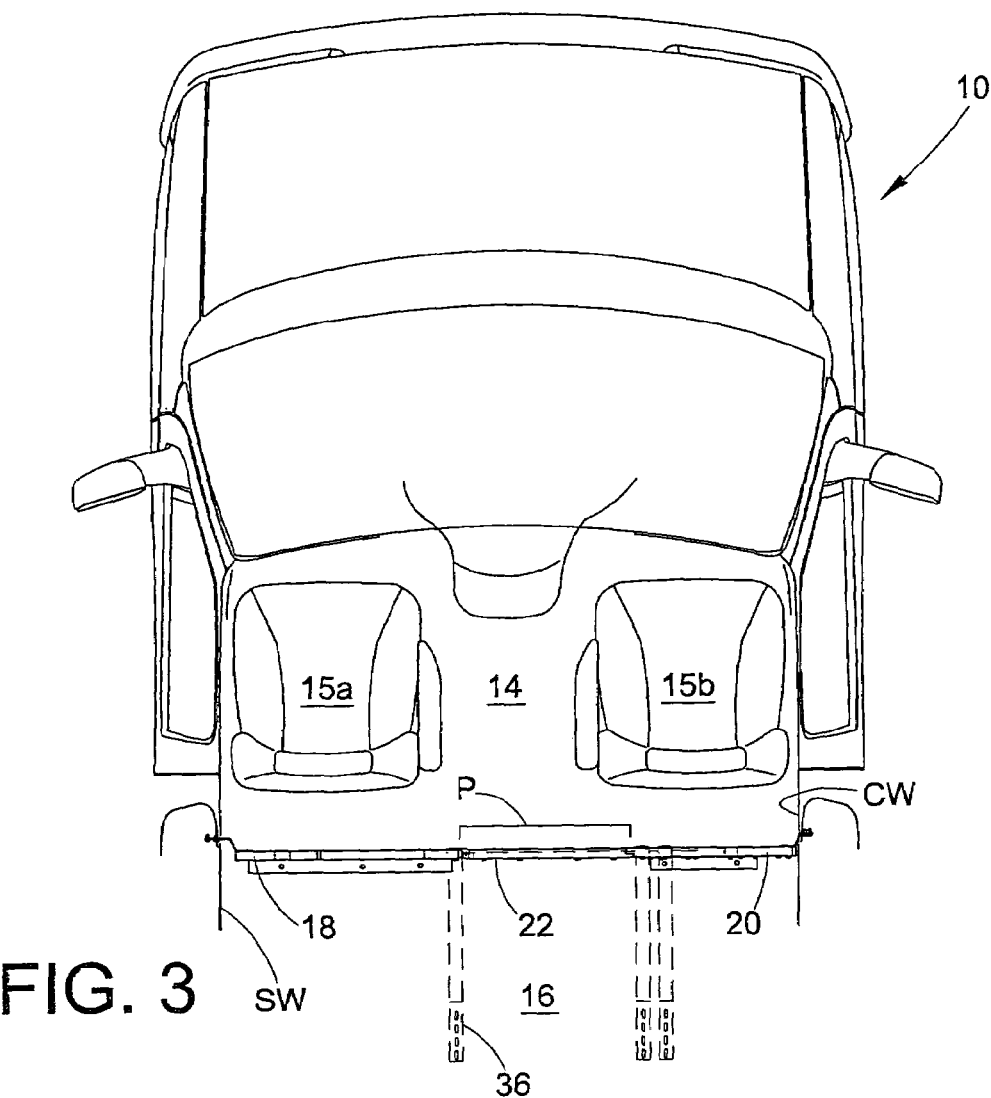
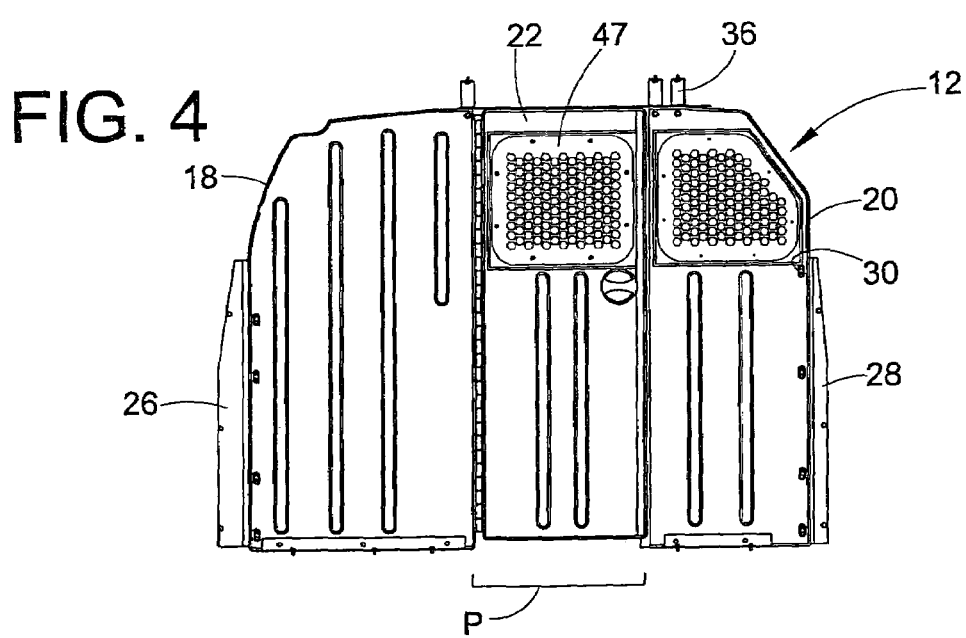

BULKHEAD ASSEMBLY FOR VEHICLES

BACKGROUND

The present disclosure relates to bulkhead assemblies for vehicles. It finds particular application in conjunction with vehicles such as, for example, cargo vans and the like, and will be described with particular reference thereto. However, it is to be appreciated that the present exemplary embodiment is also amenable to other like applications.

Bulkhead assemblies are known for use in vehicles such as trucks, vans, and the like, that include a rear section for storing cargo (i.e., a cargo section). A bulkhead serves as a partition between the rear cargo section and the operator or cabin section of the vehicle. Thus, the bulkhead functions, in one aspect, to prevent any loose or unsecured cargo from moving into the cabin area during operation of the vehicle.

It is desirable to maximize the space of a vehicle such as a van, cargo, van, truck, or the like and provide the maximum amount of cargo area. Maximizing cargo space, however, must be balanced with providing a comfortable environment for the driver and any other passengers, who may spend a considerable amount of time driving the vehicle. Placing the bulkhead closer to the driver's and passenger's seats obviously provides a larger cargo area. The cost of placing the bulkhead, which is typically a substantially vertical partition, closer to the cabin seats is compromising the operator's comfort by limiting the total area of the cabin and/or the ability of the operator(s) to recline the respective seats.

Another drawback to known bulkheads is that they are typically constructed of metal materials. The use of metal panels increases the noise in the vehicle due to metal cargo striking the metal bulkhead and/or vibration between the metal bulkhead and the metal pieces connecting the bulkhead to the vehicle.

Thus, there is a need for a bulkhead assembly that allows the space of both the cargo area and the cabin area to be maximized as desired. There is also a need for a bulkhead that provides extra space in the vehicle's cabin to allow the driver to recline his or her seat to a comfortable position. Additionally, there is a need for a bulkhead whose primary components are formed from a material other than metal.

BRIEF DESCRIPTION

In accordance with one aspect of the present disclosure, a bulkhead, for a vehicle having a street-side, a curb-side, and a longitudinal center line comprises a first panel adjacent to the street-side of the vehicle; a second panel adjacent to the curb-side of the vehicle; and a door panel disposed between and hingedly attached to one of the first and second panels, wherein the first, second, and door panels are formed from a polymer material.

In accordance with another aspect of the present disclosure, a bulkhead, for a vehicle having a street-side, a curb-side, and a longitudinal center line comprises a first panel adjacent and substantially perpendicular to the street-side of the vehicle; a second panel adjacent and substantially perpendicular to the curb-side of the vehicle; and a door panel hingedly connected to the first panel, wherein each of the first, second, and door panels is formed from a polymer material.

In accordance with a further aspect of the present disclosure, a bulkhead assembly, for a vehicle having a street-side, a curb-side, a longitudinal center line, and including a driver's seat having a moveable seat back with a seat width, comprises a first panel adjacent and substantially perpendicular to the street-side wall of the vehicle; a second panel adjacent and substantially perpendicular to the curb-side wall of the vehicle, the second panel lying substantially in the same vertical and horizontal planes as the first panel; and a door hingedly attached to one of the first and second panels, wherein each of the first panel, second panel, and door is formed from a polymer material, and the first panel defines a cavity i) extending toward a cargo portion of the vehicle and ii) sized to accommodate the driver's seat when the driver's seat is moved back or the seat back is tilted into a reclined position.

BRIEF DESCRIPTION OF THE DRAWINGS

FIG. 3 is a top plan view of a cargo van with the roof removed showing the cabin area, the bulkhead assembly of FIG. 1, and a portion of the cargo area;

FIG. 4 is a rear elevation of the bulkhead assembly of FIG. 1;

FIG. 17b is a rear elevational view of the panel in FIG. 17a;

FIG. 17c is a front elevational view of the panel in FIG. 17a;

FIG. 17d is a top plan view of the panel in FIG. 17a;

DETAILED DESCRIPTION

The present disclosure relates to a bulkhead assembly suitable for use in a vehicle such as a van, cargo van, truck, or the like. Vehicles such as vans, commercial vans, cargo vans, trucks, and the like include a forward section, a rear section, a longitudinal center line, a street-side, and a curb-side. Using the American convention for driving, the area left of the longitudinal center line of the vehicle is referred to as the street-side and the area right of longitudinal center line of the vehicle is referred to as the curb-side. The terms "street-side" and "curb-side" are merely used for purposes of convenience. It will be appreciated that items defined as a street-side item or a curb-side item can be switched along the longitudinal center line of the vehicle without departing from the scope of the disclosure.

Generally, a bulkhead assembly in accordance with the present disclosure comprises a first panel adjacent and substantially perpendicular to a street-side wall of the vehicle, a second panel adjacent and substantially perpendicular to a curb-side wall of the vehicle, and a third panel (also referred to herein in as a door panel or door) positioned between the first and second panels and hingedly attached to one of the first and second panels, wherein the first panel, the second panel, and the door panel are made from a polymeric material. In one embodiment, each of the first panel, the second panel, and the door panel are substantially vertical and substantially planar. In another embodiment, at least one of the street-side panel and/or the curb-side panel defines a cavity sized to accommodate the driver's or passenger's seat, respectively, when such seats are moved rearward and/or into a reclined position.

Figure 1:
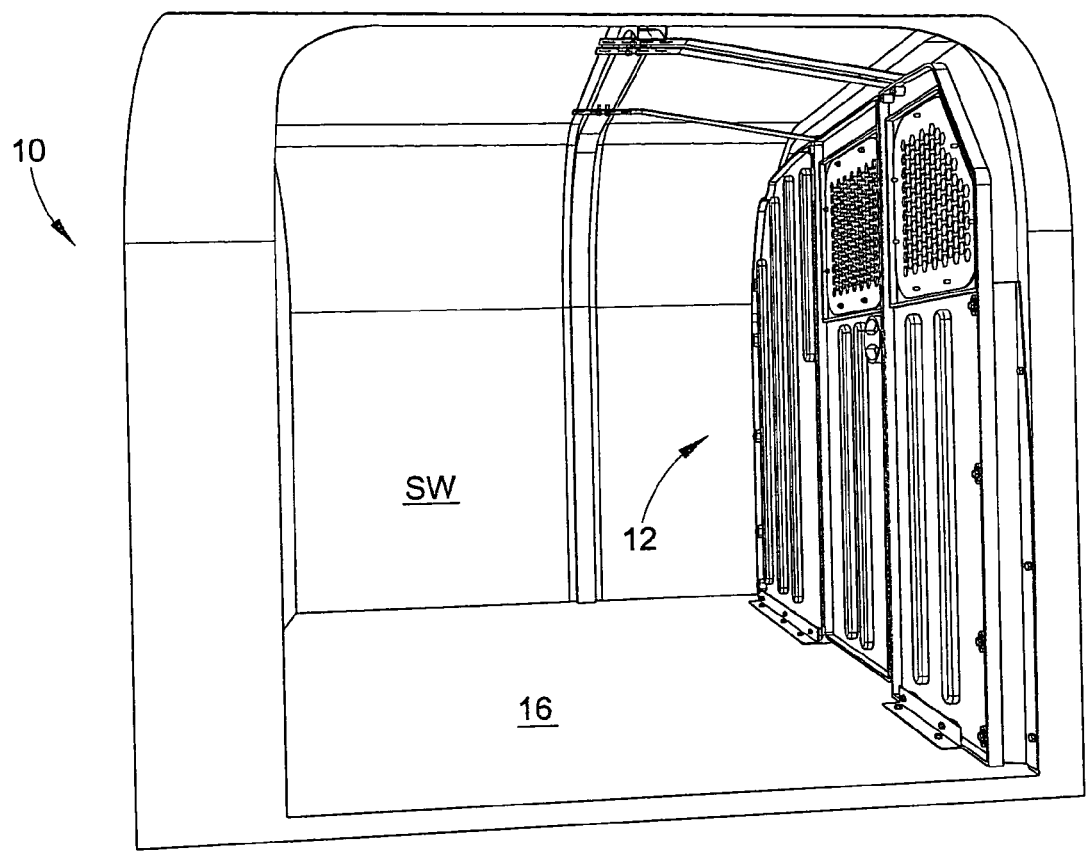
FIG. 1 is a side perspective, partially cut away, of the cargo area of a cargo van that includes one embodiment of a bulkhead assembly in accordance with of the present disclosure.
Figure 2:
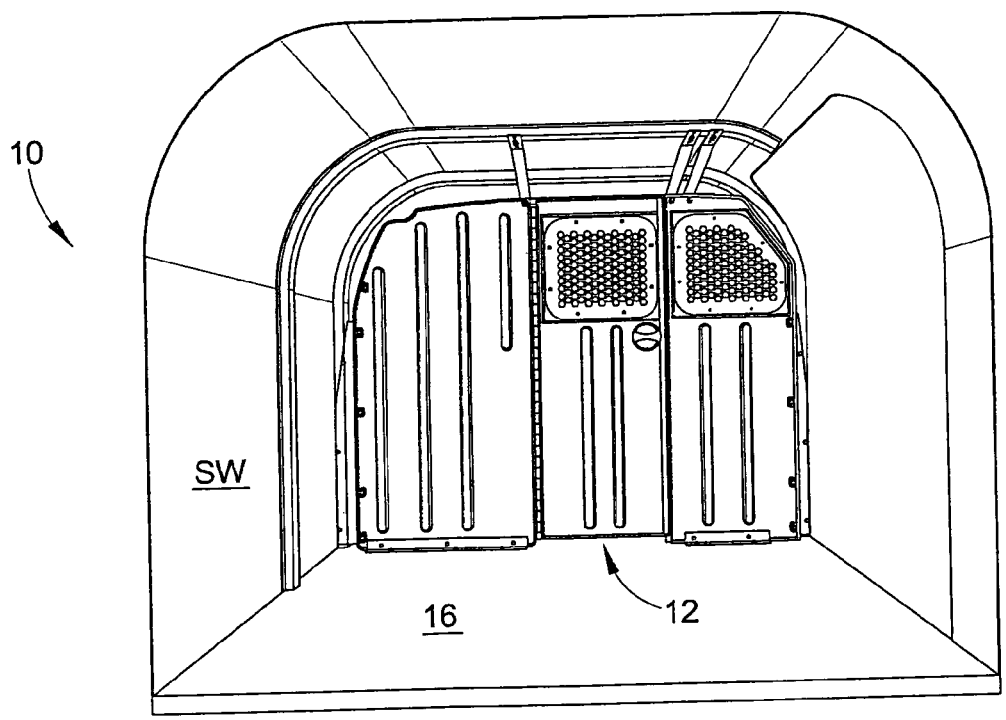
FIG. 2 is a view from the inside rear of the cargo van of FIG. 1.

With reference to FIGS. 1-9, one embodiment of a bulkhead assembly in accordance with the present disclosure is shown. As shown in FIGS. 1-3, a cargo van 10 comprises a bulkhead assembly 12 separating a cabin area 14 from a cargo area 16. The bulkhead assembly 12 comprises a first panel 18 adjacent a street-side wall SW of the vehicle, a second panel 20 adjacent a curb-side wall CW of the vehicle, and a door panel 22 disposed between the first and second panels. A door panel 22 is hingedly attached to one of the first and the second panels. As shown in FIGS. 1-9, the bulkhead assembly 12 extends substantially across the entire width of the vehicle. The bulkhead assembly 12 is substantially perpendicular to the street-side and curb-side walls of the vehicle. In the embodiment in FIGS. 1-9, each of the panels of bulkhead assembly 12 are considered flat in that the panels are substantially planar and vertical and do not define any major cavities or channels with the exception of any ribbing that may be included for decorative or reinforcing purposes.

Each of the first panel, the second panel, and the door panel have a front surface oriented toward the cabin portion of the vehicle (surfaces 18a, 20a, and 22a respectively), and a rear surface oriented toward the cargo area of the vehicle (surfaces 18b, 20b, and 22b respectively). Each of the first and second panels includes a first edges 18c and 20c, respectively, oriented toward a side wall of the vehicle and a second edge 18d and 20d oriented toward the center line of the vehicle between the side-walls of the vehicle (i.e., the longitudinal axis of the vehicle). A passageway P is defined between edges 18d and 20d of panels 18 and 20 when panel (e.g., door 22) is moved into an open position thereby allowing a passenger to enter the cargo area through the cabin area, or vice versa, without having to exit the vehicle. Edges 18c and 20c may include a substantially vertical segment and an angled or rounded toward a top edge of the panel to more closely mimic or fit the shape or contour of the wells of the vehicle.

Figure 6:
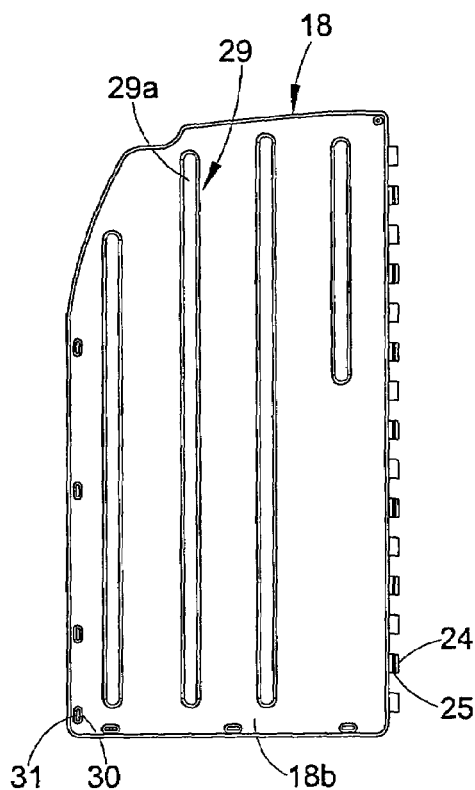
FIG. 6 is a rear elevation of the street-side panel of the bulkhead assembly of FIG. 1.
Figure 7:
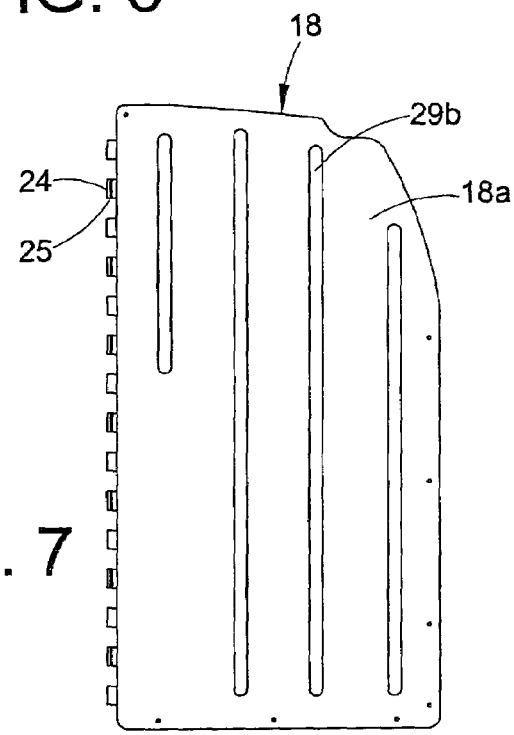
FIG. 7 is a front elevational view of the street-side panel of the bulkhead assembly of FIG. 1.

A panel, e.g., door 22, may be hingedly connected to either the first or second panel in any suitable manor. As shown in the embodiment in FIGS. 1-9, door 22 is hingedly attached to the first panel 18. The hinge is created via cylinder shaped projections 24a that extend from and are integral with edge 18d of panel 18 and cylinder-like projections 24b that extend from and are integral with a hinged edge 22c of door panel 22. Each of the projections 24a and 24b include a slot 25. The cylinder projections 24b are positioned to fit in between or adjacent cylinder projections 24a on panel 18. A hinge pin 63 is inserted through slots 25 of the cylinder projections to hingedly connection door 22 to panel 18. Some of the cylinder projections in FIGS. 6 and 7 are shown in cross section to expose slot 25 that extends therethrough. The door may be hingedly connected to one of the panels in any other suitable manner including, but not limited to, a separate hinge assembly that is individually fastened to each of the door panel and one of the first or second panels. For example, other hinge structures such as several discrete hinges or a piano hinge may be used.

The bulkhead assembly 12 is attached to the interior of cargo van 10 at several different locations via appropriate attachment brackets. The first panel 18 and the second panel 20 are attached to a street-side wall and the curb-side wall of the vehicle via attachment brackets 26 and 28, respectively. Panels 18 and 20 each include a plurality of projections 30 near the vertical edges of the panel. Projections 30 define apertures 31 that extend through the panels 18 and 20, and are adapted to receive a fastener to fasten the attachment brackets 26 and 28 to the respective panels. First and second panels 18 and 20 are attached to the floor of the vehicle via brackets 38a and 38b respectively. Brackets 38a and 38b resemble angle iron brackets and have a vertical flange and a horizontal flange perpendicular to the vertical flange. The vertical flange of the brackets 38a and 38b each comprise a plurality of apertures positioned to correspond to projections 30 near the base of panels 18 and 20. Similar to the vertical projections, the projections 30 along the base of the panels define apertures adapted to receive a fastener. Bulkhead assembly 12 is also attached to the ceiling of the vehicle via ceiling brackets 36 through apertures near a top edge of the panels. It will be appreciated that the panels of a bulkhead assembly in accordance with the present disclosure may be attached to the vehicle using any suitable bracket and is not limited to the brackets depicted in the present embodiments. That is, the brackets may be sized and shaped as desired to suit a particular purpose or intended use. The shape and size of the attachment brackets may vary depending on factors including, but not limited to, cost, vehicle type, and the attachment location.

Figure 5:
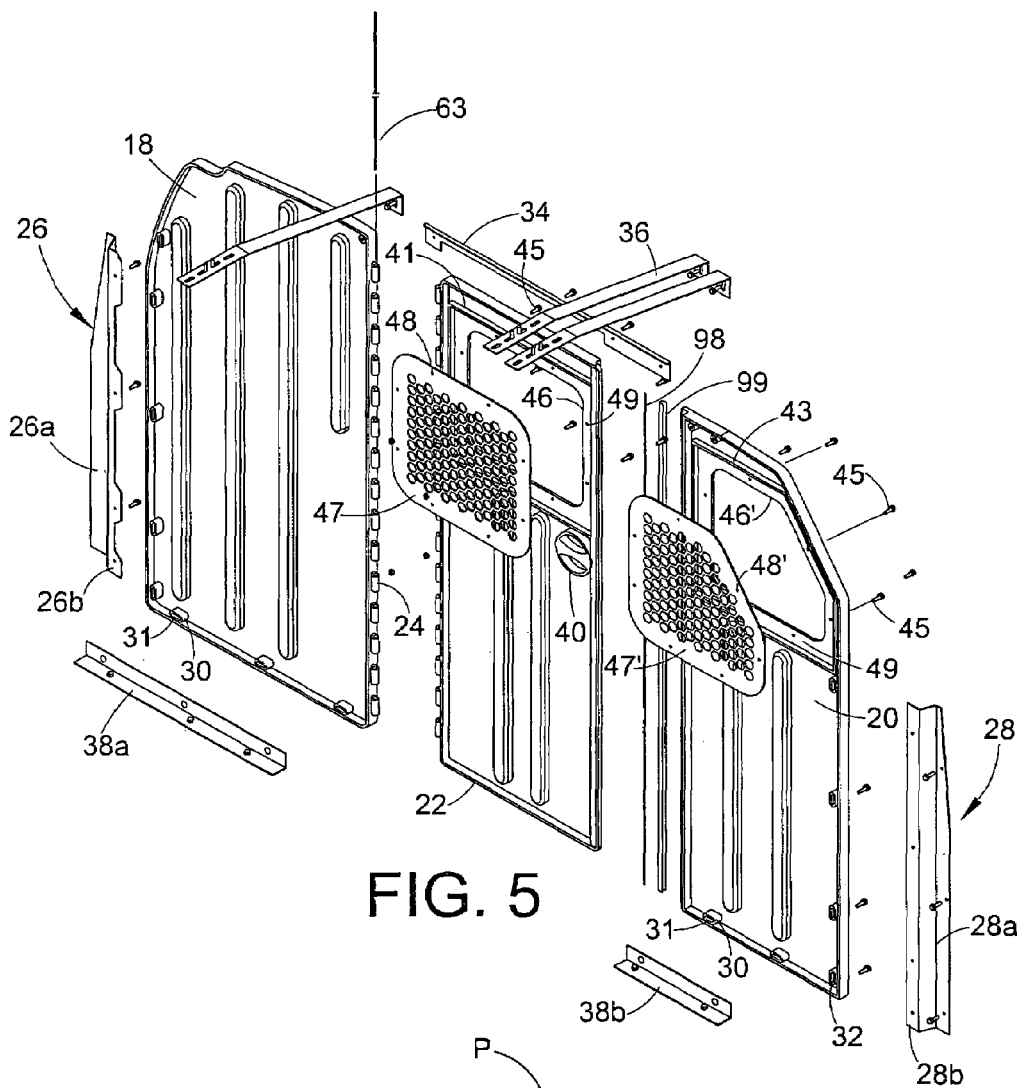
FIG. 5 is an exploded view of the bulkhead assembly of FIG. 1.

As shown in FIG. 5, the top of panel 18 is attached to the top of panel 20 by a connector bracket 34. Bracket 34 may be attached to panel 18 and panel 20 by any suitable manner including, for example, by fasteners. Connecting the first and second panels via, for example, connector bracket 34 may be useful to further stabilize and support the bulkhead assembly.

As shown in bulkhead assembly 12, door panel 22 and second panel 20 include a window or view area defined by cutout portions 46 and 46'. The window area is covered by an object such as mesh screen 47 and 47', which is held in place by fasteners 45 extending through apertures 48 and 48' of mesh screens 47 and 47' and corresponding apertures 49 of the respective panels.

Figure 8:
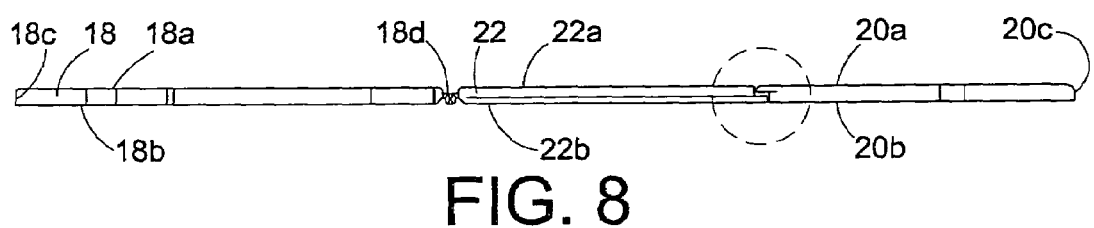
FIG. 8 is a top plan view of the bulkhead assembly of FIG. 1.
Figure 8A:
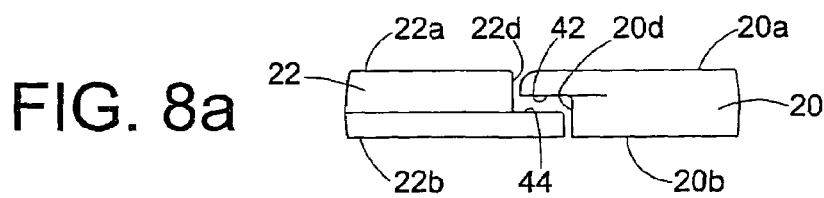
FIG. 8a is a detail of the circled area of FIG. 8.

A door stop system may be provided to prevent door panel 22 from swinging open into the cabin area of the vehicle. A door stop system is provided in bulkhead assembly 12 by opposing flanges 42 and 44 (FIG. 8a). Flange 42 extends from surface 20a of panel 20 substantially perpendicular to edge 20d. Flange 44 extends from surface 22b of door panel 22 substantially perpendicular to non-hinged edge 22d. Flange 42 is adapted to contact flange 44 and prevent the door panel from swinging in toward the cabin area of the vehicle. It will be appreciated that, if desired, the flange may be provided on the opposite surfaces of the respective panel to prevent the door from opening into the cargo area.

Figure 9:
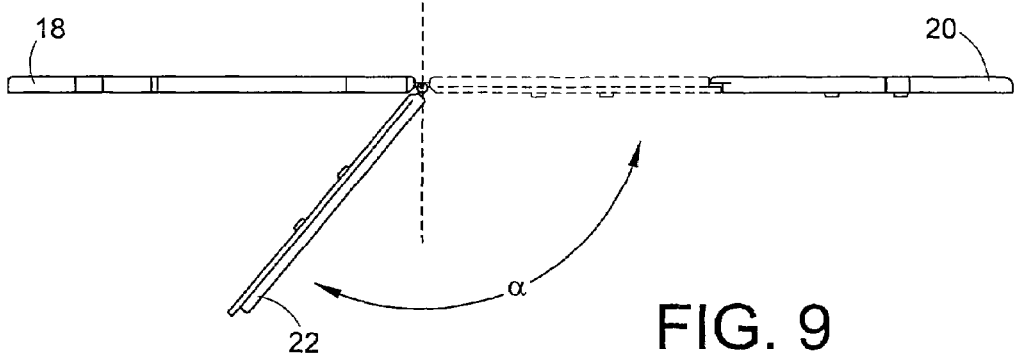
FIG. 9 is a top plan view of the bulkhead assembly of FIG. 1 showing the door in a fully opened position.

FIG. 9 shows door panel 22 swung into a fully open position. In its fully open position, door panel 22 defines an angle α relative to its closed position. Generally, door panel 22 can be opened to a point where the hinged edge of door panel 22 abuts or makes contact with the hinged edge 18d of, for example, first panel 18, thereby defining an angle α. The angle depends on the thickness of the respective panels and the hinge assembly employed. In one embodiment, the angle α is about 140°. A door angle of at least about ninety degrees (90°) is an advantage as it allows full doorway width access to the cargo area when the door is opened.

Figure 10:
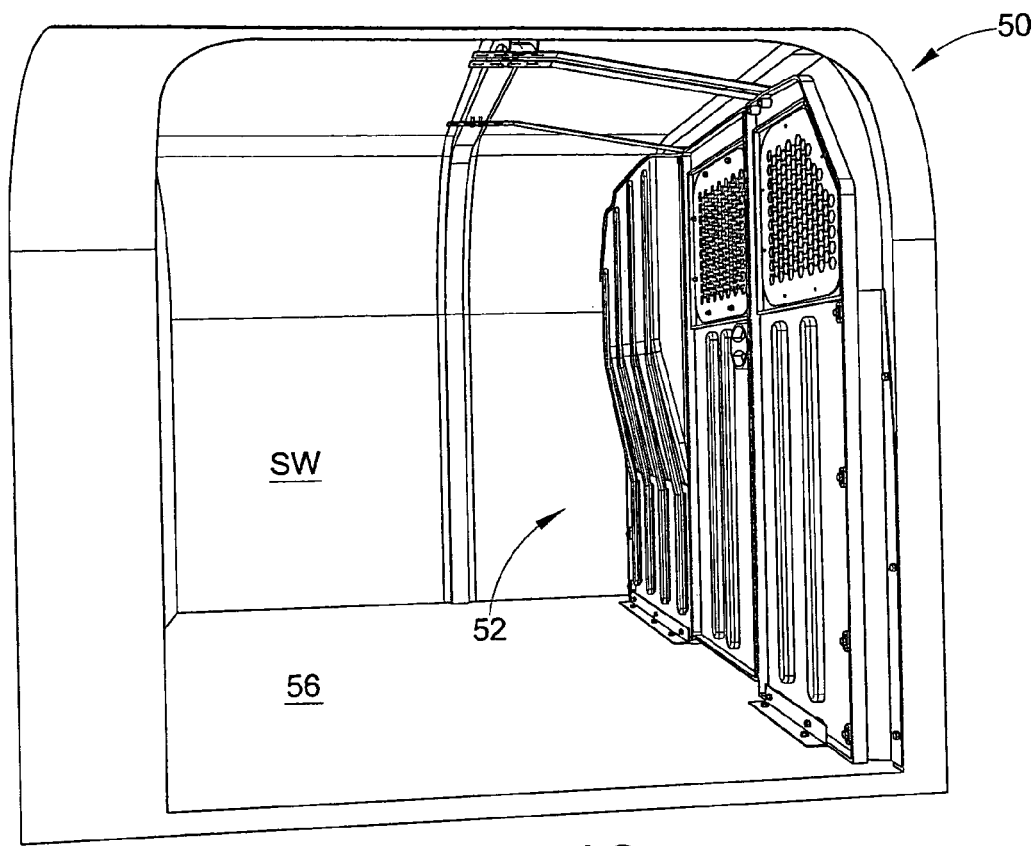
FIG. 10 is a side perspective, partially cut away, of a cargo van including a bulkhead assembly of a second embodiment in accordance with the present disclosure.
Figure 11:
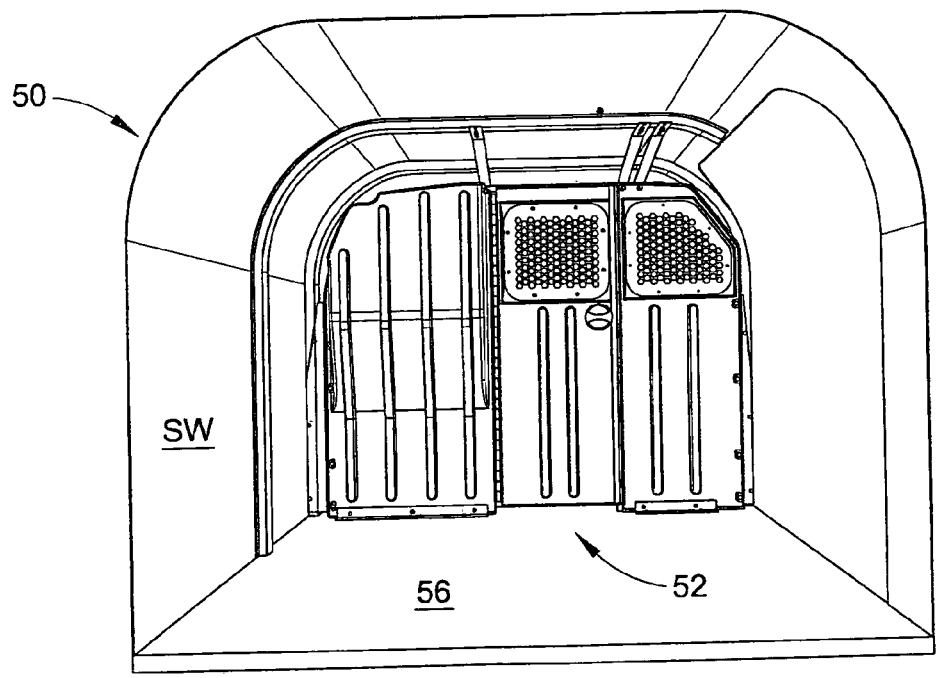
FIG. 11 is a view from the inside rear of the cargo van of FIG. 10.
Figure 12:
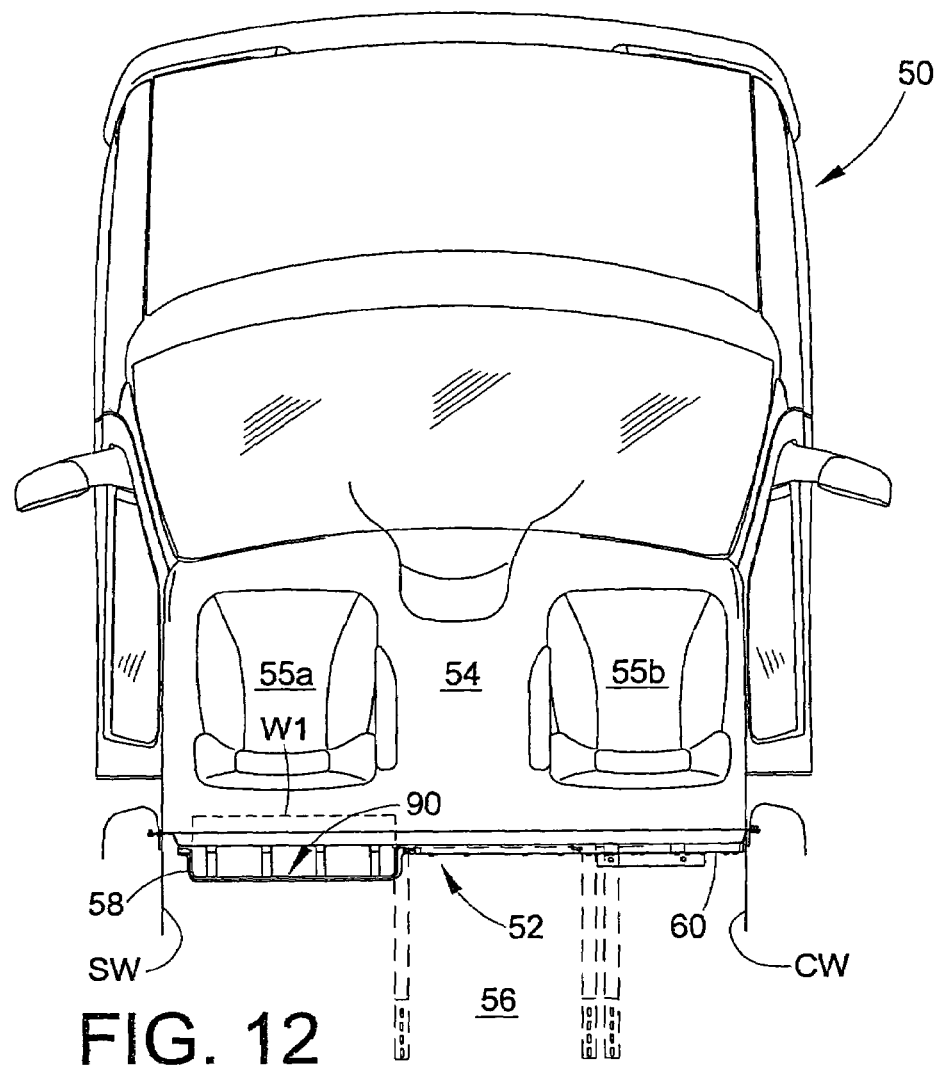
FIG. 12 is a top plan view of the cargo van of FIG. 10 with the roof removed showing the cabin area, the bulkhead assembly of FIG. 10, and a portion of the cargo area of the vehicle.
Figure 13:
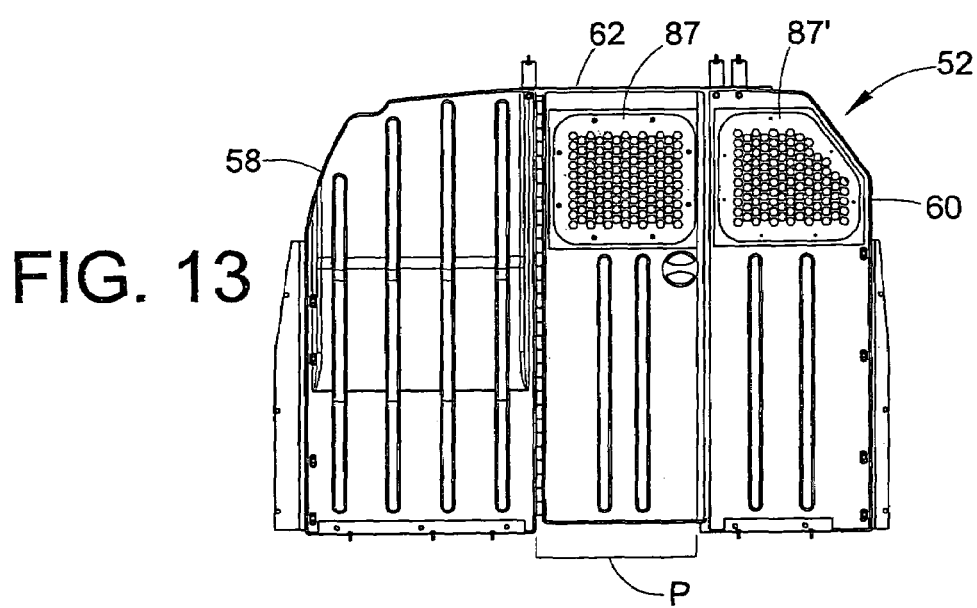
FIG. 13 is a rear elevational view of the bulkhead assembly of FIG. 10.

With reference to FIGS. 10-18, a second embodiment of a bulkhead assembly in accordance with the present disclosure is shown. As shown in FIGS. 10-12, bulkhead assembly 52 is positioned in vehicle 50 and divides cabin 54 from cargo area 56. Bulkhead assembly 52 comprises a first panel 58 adjacent and substantially perpendicular to a street-side wall SW of the vehicle, a second panel 60 adjacent and substantially perpendicular to a curb-side wall CW of the vehicle, and door panel 62 disposed between first panel 58 and second panel 60, and hingedly attached to first panel 58.

The second panel 60, door panel 62, as well as the connection pieces displayed in bulkhead assembly 52 are as described with respect to the corresponding structures in bulkhead assembly 12 and reference is made to the previous discussion of those structures. Bulkhead 52 employs a different type of first (or street-side) panel, which is described below.

First panel 58 of bulkhead assembly 52 is contoured and defines a cavity 90 (FIG. 12). Cavity 90 has a width W1 sized to receive the seat-back portion 57 of seat 55a when the seat-back portion 57 of seat 55a is moved to a reclined position. Cavity 90 is defined by a vertical portion 94 and an angled portion 93 (FIG. 15) recessed relative to the cabin surface 58a of panel 58. That is, cavity 90 extends rearwardly into the cargo area of the vehicle and has a depth d.

It will be appreciated that a contoured panel for a bulkhead assembly in accordance with the present disclosure is not limited to a contoured panel depicted in the embodiment of FIGS. 10-18. A contoured panel may be configured as desired to suit a particular purpose or intended use. The width of the cavity is not limited except to the extent that the cavity (e.g., cavity 90) have a width sized to accommodate a seat back of, for example, a driver's seat, positioned in the cabin in front of the contoured panel. The depth of the cavity is not limited in any manner and may be selected as desired for a particular purpose or intended use. Additionally, the shape of the cavity is not limited to the shape of the cavity depicted in the embodiment of FIGS. 10-18. For example, the cavity may be angled from the top edge of the panel, i.e., not include any vertical portion, or may be curved or rounded. In one embodiment, the cavity may be a substantially vertically recessed wall and extend the entire height of the panel.

Figure 15:
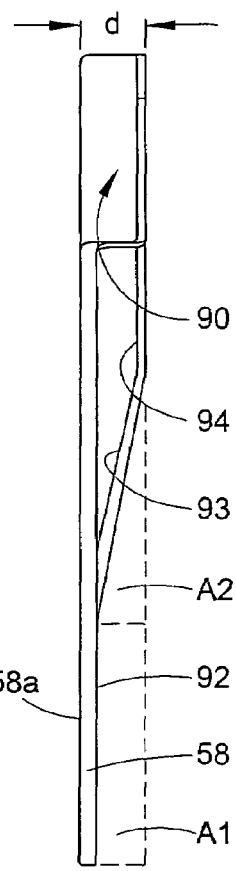
FIG. 15 is a side elevational view of the street-side panel of the bulkhead assembly of FIG. 10.
Figure 16:
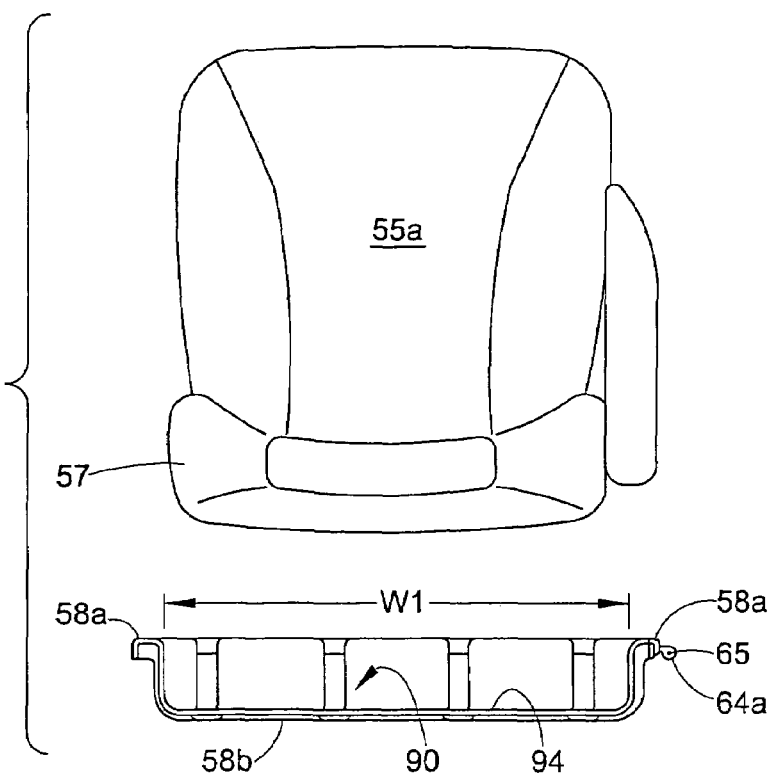
FIG. 16 is a top plan view of a portion of the cabin area showing the driver's seat and the street-side panel of the bulkhead assembly of FIG. 10.
Figure 17A:
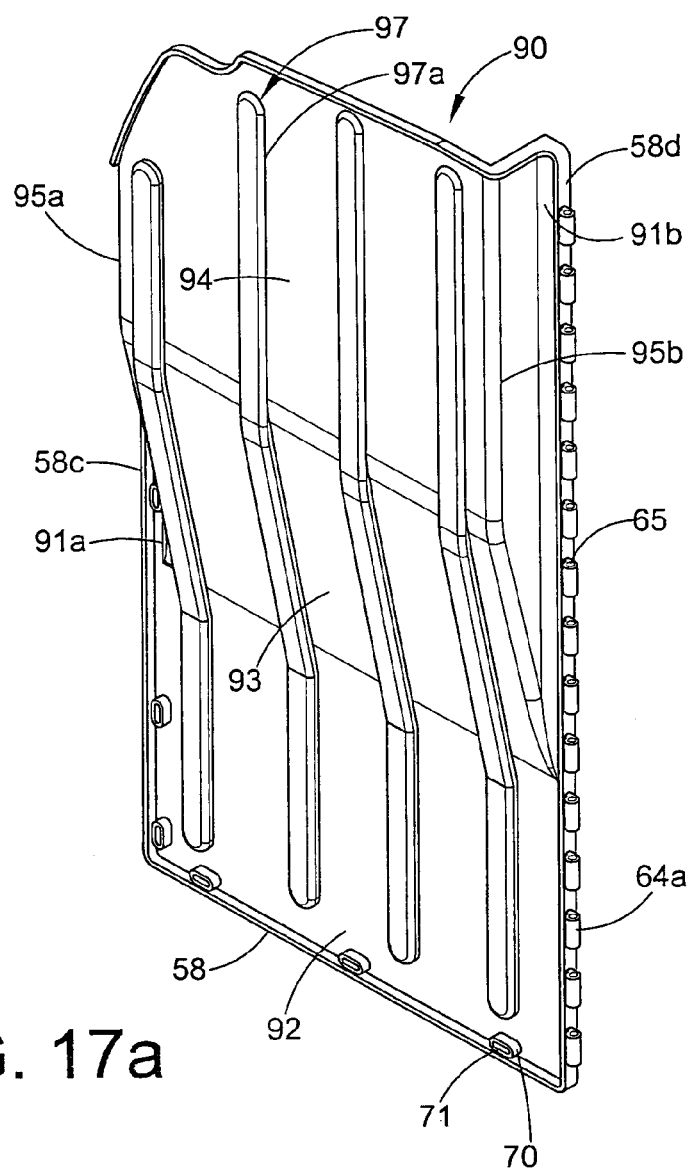
FIG. 17a is a perspective of the street-side panel of the bulkhead assembly of FIG. 10.

It is desirable, however, to have the cavity form only a select portion of the panel height so as to limit the amount of cargo area that is reduced by the use of a contoured panel. The primary purpose of the recess is the accommodation of the driver's seat back. It is also desirable to provide a cavity having a shape, size, and location to only accommodate a driver-seat seat back and maximize cargo space. With reference to FIGS. 15 and 17a-17d, panel 58 includes marginal portions 91a and 91b adjacent edges 58c and 58d, respectively, and having a width W2 and W3, respectively. Panel 58 includes a vertical lower portion 92 extending from the base of panel 58 to a selected height. Cavity 90 is defined by an angled portion 93, which angles out of the plane of vertical lower portion 92 into the cargo area of the vehicle, a vertical upper portion 94 integral with angled portion 93, and wall or flanges 95a and 95b that are integral with marginal portions 91a and 91b, respectively, and are also integral with angled portion 93 and vertical upper portion 94. Thus, angled portion 93 and vertical upper portion 94 are longitudinally disposed behind or rearward of vertical lower portion 92. By cavity 90 forming only a select portion of the panel 58, an area under the vertical upper portion 94 and angled portion 93 is still available for storing cargo. As shown in FIG. 15, the available area may be viewed as the sum of areas A1 and A2. The area A1 is defined under vertical upper panel 94 from the edges of panel 58, and from the base of panel 58 to the bottom of angled portion 93 along a line extrapolated from the edge of vertical upper portion 94. The area A2 is defined under vertical upper panel 94 from the edges of panel 58 and from the bottom of angled portion 93 to the top of angled portion 93 (i.e., where angled portion 93 meets vertical upper portion 94).

Door 62 is hingedly attached to panel 58 in a manner similar to that previously described with respect to the embodiment of FIGS. 1-9. Panel 58 and door 62 comprise cylinder projections 64a and 64b, respectively, having slots 65 extending therethrough. The projections are spaced apart such that projections 64b may be placed between successive projections 64a and panel 58. The hinged connection is provided by a pin 63 inserted through slots 65 of the projections.

Figure 18:
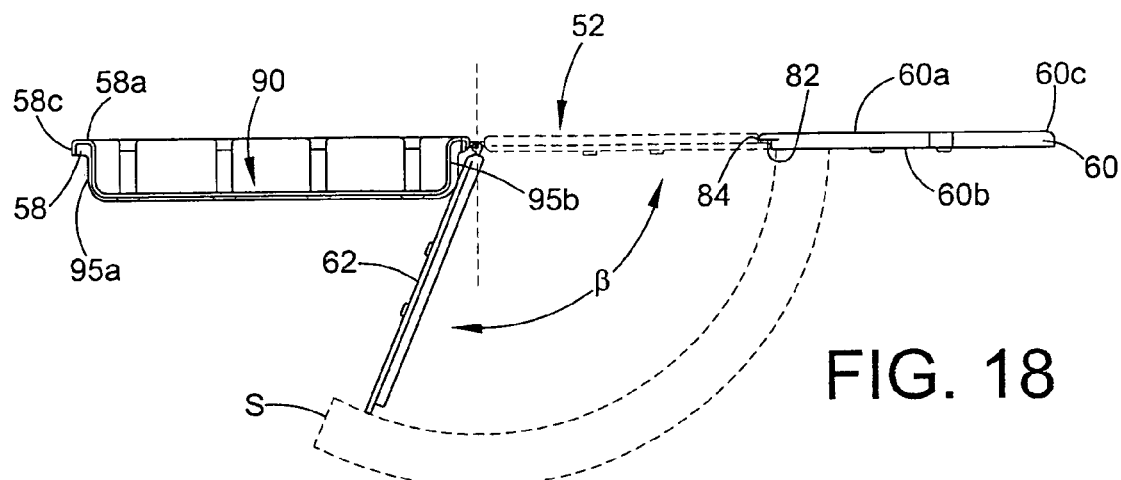
FIG. 18 is a top plan view of the bulkhead assembly of FIG. 10 with the door in a fully open position.
Figures 17B, 17C:
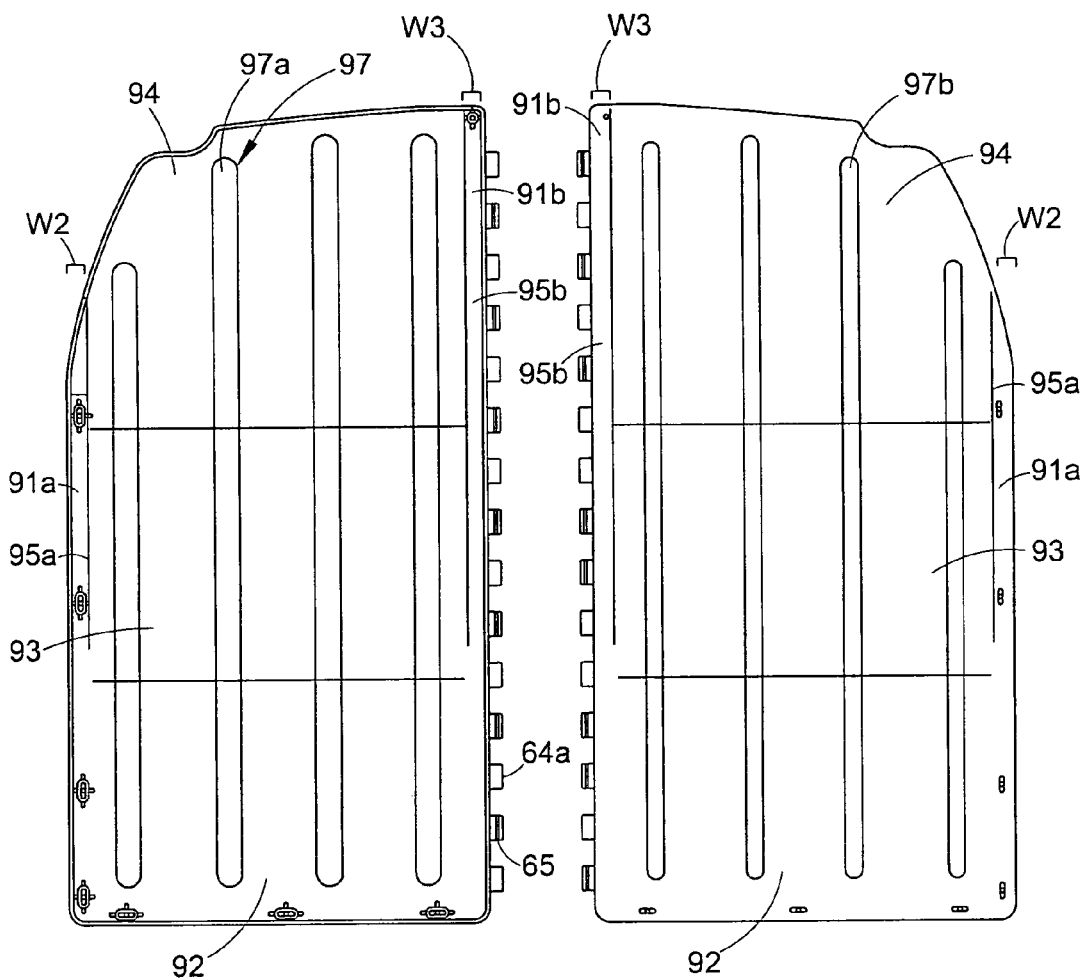
Figure 17D:
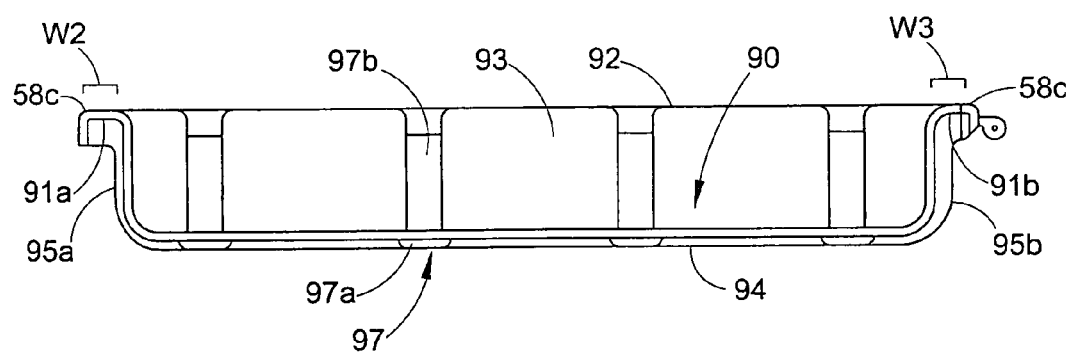

As shown in FIG. 18, contoured panel 58 restricts the degree to which door panel 62 can open into the cargo area. It is desirable that the door be positioned forward of the cavity so that upon being rotated open it does not extend to far back into the cargo area. When opened, door 62 eventually contacts a portion of wall 95b, which defines the exterior of cavity 90, such that door 62 cannot open or extend beyond a certain point. As shown in FIG. 18, in the fully opened position, door 62 defines an angle β relative to the fully closed position of the door. In one embodiment, the angle β is at least 90°. In another embodiment, the angle β is about 115°. The angle β will depend on the shape, width, and depth of the cavity. As shown in FIG. 18, even though the angle by which the door 62 can be opened is slightly reduced, by not moving door 62 back and keeping it forward of the cavity, extra space S is created in the cargo area. More specifically, if the door were moved back toward the vertical plane of upper vertical wall 94 then an area S of the cargo area or a portion thereof would be lost to allow for clearance of the door as the door is rotated to an open or closed position.

Figure 19:
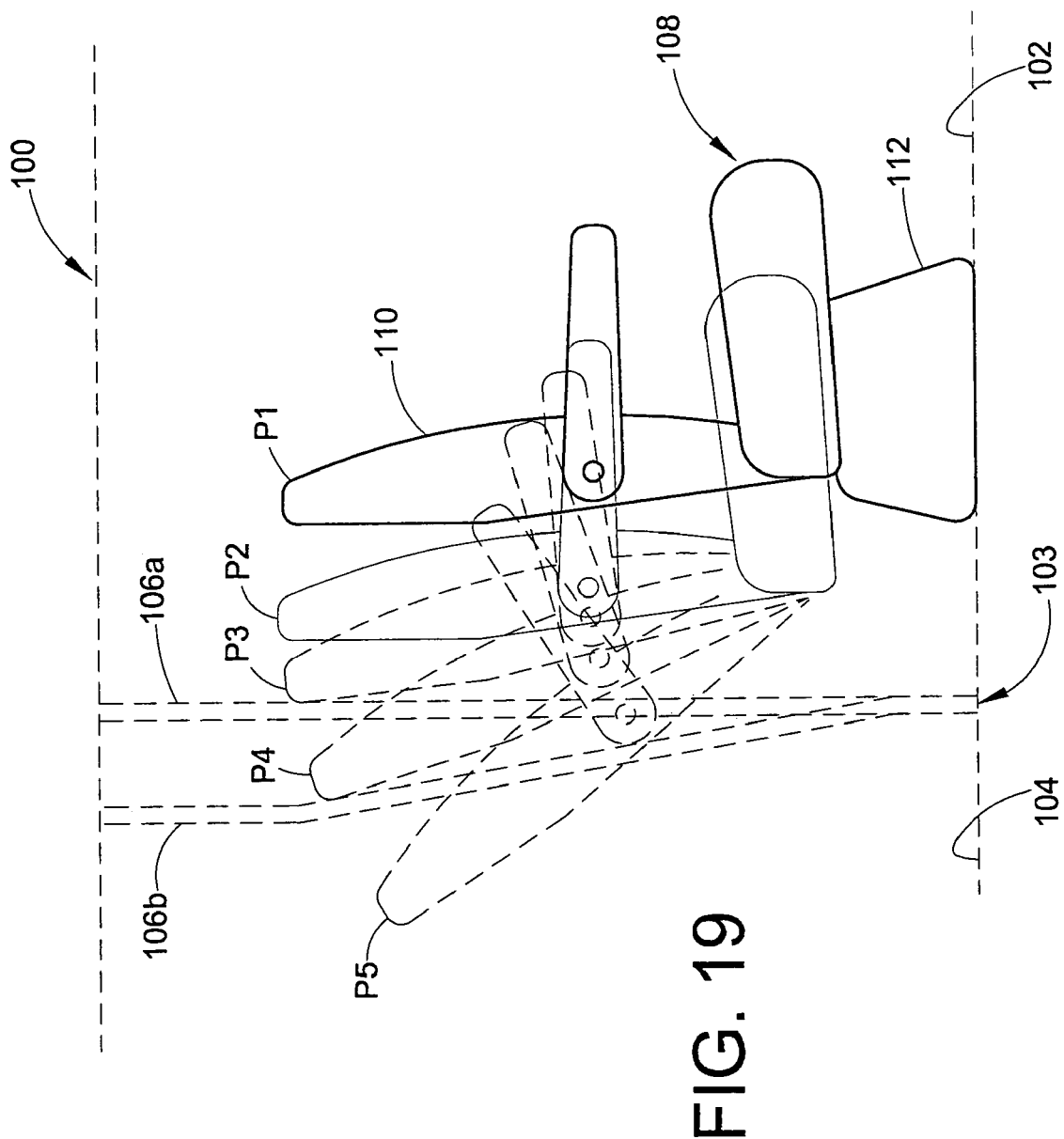
FIG. 19 is a side elevation schematic of the driver's side of the vehicle displaying different seat configurations possible utilizing different bulkhead assemblies in accordance with the present disclosure.

With reference to FIG. 19, a schematic representation is shown depicting different possible seat positions in a vehicle employing bulkhead assemblies in accordance with the present disclosure. FIG. 19 shows the driver's portion of a vehicle 100 with cabin area 102 and cargo area 104 separated by a bulkhead assembly 103 in accordance with the present disclosure employing one of a flat panel 106a or a contoured panel 106b adjacent a street-side wall of the vehicle. Bulkhead 103 is positioned at the same location in the vehicle relative to cabin area 102 and cargo area 104, but employs different first or street-side panels, i.e., flat panel 106a or contoured panel 106b. Cabin area 102 includes driver's seat 108 with seat-back 110 and mounting base 112. Seat 108 is adapted to be moved forward or backward relative to mounting base 112. At position P1, seat 108 is moved to its full forward position with seat-back 110 in a fully upright position. At position P2, seat 108 is moved to its fully backward position with seat-back 110 in its fully upright position. At position P3, seat 108 is moved fully backward, and seat-back 110 is partially reclined. Seat 108 may be in position P3 when either a flat panel 106a or a contoured panel 106b is employed in bulkhead assembly. Position P4 depicts seat 108 in full backward position and reclined past position P3. Reclining seat 108 to position P4 is possible using a contoured panel 106a in accordance with the present disclosure. It will be appreciated that seat-back 110 may be reclined to position P4 when using a bulkhead assembly comprising a flat panel such as panel 106a if the bulkhead assembly is moved toward the rear (i.e., into the cargo area) of the vehicle. Position P5 depicts the seat in a full backward position and fully declined. Reclining seat-back 110 to position P5 is obtainable by 1) moving the bulkhead assembly comprising either panel 106a or 106b toward the rear of the vehicle and further into the cargo area, or 2) eliminating or removing the bulkhead entirely. The ability to move the driver's seat to a variety of positions between P1 and P3 or, better, between P1 and P4 is a significant advantage. This ability means that a given installation will accommodate drivers of a large variety of sizes. This ability also improves the comfort of a driver who may spend a significant portion of his or her work day in a bulkhead equipped truck or van.

The panels of a bulkhead assembly in accordance with the present disclosure are formed from a material other than metal. The panels are formed from a polymer material such as plastic materials. Suitable plastic polymers include, but are not limited to, polyethylenes, polypropylenes, polystyrene, acrylonitrile-butadiene-styrene resins, phenolic resins, polyurethanes, polyolefins, polyisocyanurates, and the like. The polymer materials may also be composite materials, i.e., a polymer matrix reinforced with a fiber or other reinforcing material having a sufficient length to thickness ratio to provide a desirable reinforcing function in one or more directions. In one embodiment, the polymer material is a foamed polymer. Foamed polymers are also known as cellular polymers, polymeric foams, and expanded polymers. Examples of suitable foamed polymers include, but are not limited to, cellular polystyrene, polyurethane foams, polyisocyanurate foams, phenolic foams, cellulose acetate, polyolefin foams.

The panels of a bulkhead assembly in accordance with the present disclosure may be formed by any suitable molding method including, but not limited to, injection molding, blow molding, vacuum forming, and the like. Foamed polymers may be formed by injection molding, blow molding, extrusion, casting, vacuum forming, and the like.

The panels may include a plurality of ribs as desired for aesthetic or structural purposes. The ribs may be sized, shaped, and located as desired for a particular purpose or intended use. For example, with reference to the embodiments in FIGS. 1-9, the panels may each include longitudinal ribs 29 formed by projections 29a on the rear surfaces of the panels and corresponding recesses 29b in the forward or front surfaces of the panels. It will be appreciated that the number, dimensions, and shapes of the ribs may be different within a given panel or on different panels. With respect to contoured panels, such as, for example, panel 58 of the embodiment in FIGS. 10-18, ribs may be continuous and extend or run through each section forming the contour. For example, with reference to FIGS. 17a-17d, panel 58 includes four longitudinal ribs 97 formed by projections 97a and corresponding recesses 97b respectively. Further, in this embodiment, each of the ribs 97 are continuous and run through each of upper vertical portion 94, angled portion 93, and lower vertical portion 92. The ribs may be formed solely by projections extending from the surface of a given side of a panel. In one embodiment, a panel may include a plurality of ribs formed by projections on one side of the panel and not having any corresponding recesses on the opposite side of the panel. In another embodiment, each side of a panel may include ribs formed by projections that do not have a corresponding recess on the opposite side of the panel. Of course, other configurations are possible and within the scope of a bulkhead in accordance with the present disclosure.

The height, width, thickness, and overall design of the individual panels of a bulkhead assembly may be selected as desired for a particular purpose or intended use. The ends of the panels near the street-side and curb-side walls may be shaped, angled, rounded or tapered near the edge of the panel to more closely conform to or mimic the shape of the vehicle walls.

It will be appreciated that the arrangement of the panels may be selected as desired for a particular purpose or intended use. For example, as depicted in the embodiments in FIGS. 1-18, the panels are arranged between the sidewalls such that the panels lie in substantially the same vertical plane. It is noted that even though the first panel 58 in FIGS. 10-18 defines a cavity that lies out of the plane of the panel, panel 58 includes marginal portions 91a and 91b, and edges 58c and 58d that connect to the street-side wall and door 62, respectively, and lie in substantially the same vertical plane as door 62 and second panel 60. The panels that form the bulkhead need not lie in substantially the same vertical plane, but may be off set or angled away from the vertical plane as desired, for a particular purpose or intended use. For example, a door panel and/or street-side panel may be off set or angled away from the street-side panel toward the front of the vehicle to provide additional cargo area behind those structures.

Figure 14:
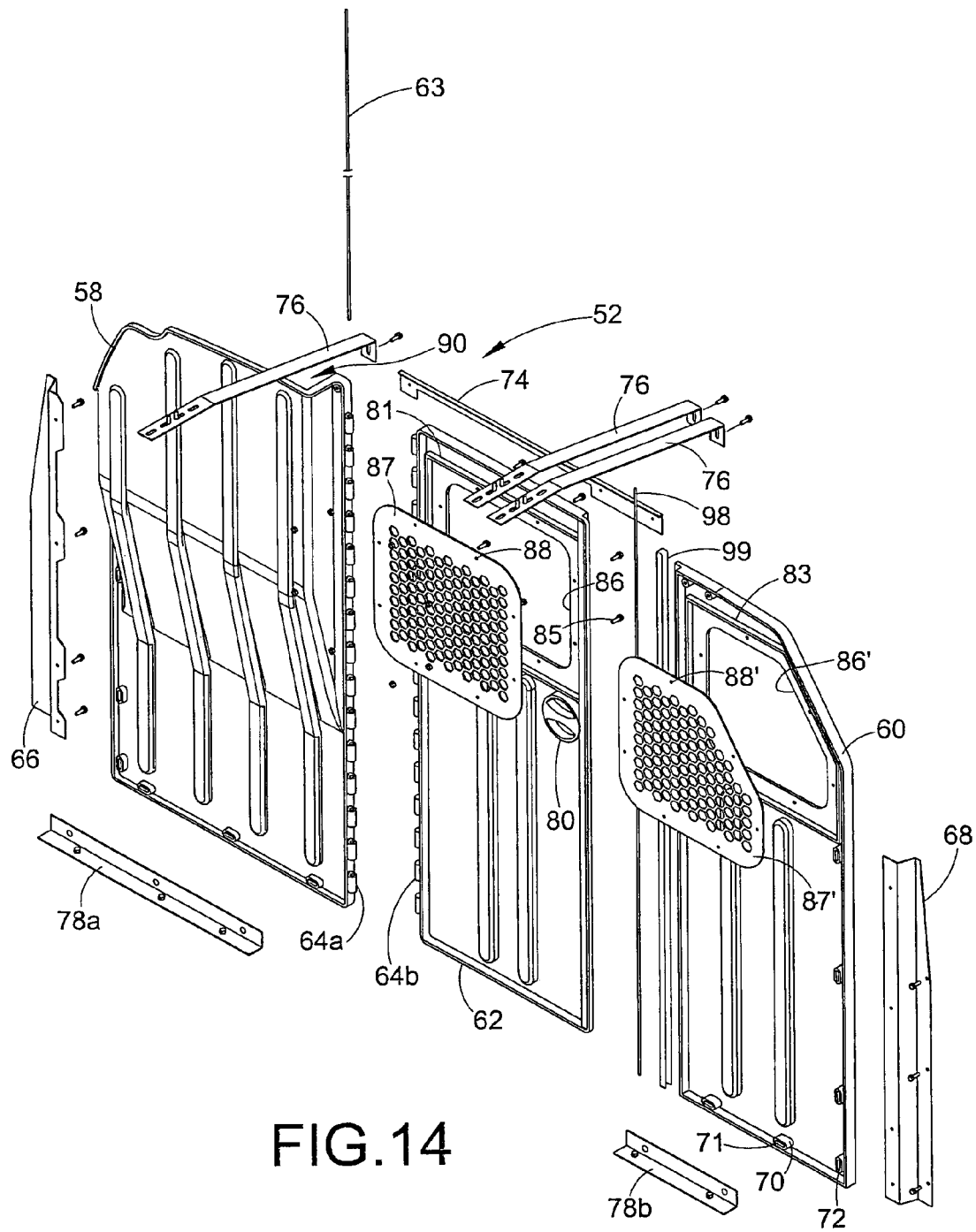
FIG. 14 is an exploded view of the bulkhead assembly of FIG. 10.

Optionally, support members may be connected to one or more of the street-side panel, the door panel, or the curb-side panel of the bulkhead assembly. With reference to FIG. 14, support members 98 and 99 are shown for attachment to the door panel 62 and the curb-side panel 60, respectively. Support member 98, may be, for example, an L-shaped or angled iron bracket and is dimensioned to be connected to the non-hinged edge of door panel 62. Support member 99 is a U-channeled member dimensioned to fit over an edge of curb-side panel 60. Each of support members 98 and 99 are connected to their respective panels by fasteners that are inserted through apertures on the support members and corresponding apertures or bores on the panels. The support members may be used to increase the strength of the respective panels. Depending on the material used for the support member, the strength of the panel may be made substantially equivalent to that of a steel panel. The support members typically decrease or prevent movement of the panel in the horizontal direction when a vertical or horizontal force is applied to the panels. The support members also decrease the flex of the panel.

The size, shape, material, and location of the support members such as support members 98 and 99 may be selected as desired for a particular purpose or intended use. For example, the support members may be L-shaped brackets, angle iron brackets, U-cannel brackets, vertical rods, vertical bars, and the like. The support members may be formed from any suitable material including metals such as aluminum, steel, and the like, or high strength polymeric materials. Where the support members are a vertical rod or vertical bar that are not required to fit over an edge of the panel, the support member may be positioned at any point on a given panel to suit a particular purpose or intended use. For a door panel, a support member is typically located near or adjacent the non-hinged edge of the door. For an end panel such as the street-side and curb-side panels, a support member is typically positioned near or adjacent the edge of the panel disposed toward the longitudinal center line of the vehicle. The support members may be connected to the respective panels by any suitable means. The support members may be releasably connected to or permanently connected to the respective panels. Some examples of suitable means include fasteners, screws, pins, bolts, rivets, welding, and the like.

As shown in the embodiments in FIGS. 1-18, a bulkhead assembly may include a window or viewing area in one or more of the panels comprising the bulkhead assembly. The windows may be formed in any manner including a cut-out covered by a suitable covering. As used herein, a window covering includes any object suitable for covering a substantial portion of the cut-out area. A window covering may be positioned relative to the cut-out area in any suitable manner including over the cut-out area as depicted in the present Figures, or the covering may be disposed in the cut-out area. For example, the bulkhead assemblies of the first and second embodiments are formed by cut-out portions (46 and 86). A protective covering such as a mesh screen (e.g., 47 and 87) or a plastic sheet is placed over the cut-out area and held in place in any suitable manner, such as, for example, by fasteners, bolts, screws, rivets, or the like.

The panels may include a member to position the window covering. For example, the panels in the embodiments depicted in FIGS. 5 and 14 include retainer members 41 on door 22, 43 on curb-side panel 20, 81 on door 62, and 83 on curb-side panel 60. The retainer members in these embodiments are essentially frames surrounding the respective cut-out areas and are formed by one or more flanges integral with the rear side of the panels. A retainer member may be any suitable structure and is not limited to the frame members depicted in the Figures. For example, the window retainer member could be formed from just a lower flange positioned beneath the cut-out area and/or an upper flange positioned above the cut-out area. In alternative embodiments, a retainer member may comprise a flange on all or less than all sides of a cut-out area. Other configurations are also possible.

In the embodiments of FIGS. 1-18, mesh screens 47 and 87 are stamped from a piece of metal to provide mesh screens 47 and 87. A mesh screen may be formed from a metal or plastic material. In alternative embodiments, the window covering may be a solid plastic sheet. A plastic sheet is preferably substantially clear to allow a person in the vehicle to see through the sheet. A non-limiting example of a suitable material for a plastic sheet to cover the cut-out window is a clear acrylic polymer material. Still another example of an appropriate material is a polycarbonate sheet, which can be made transparent and strong.

The manner in which in which a bulkhead assembly is held in place in a vehicle is not limited in any particular manner. The various panels that comprise the bulkhead may be attached to a vehicle at various locations as desired to position the bulkhead within the vehicle or to meet a particular purpose or intended use. Further, the size and shape of the attachment pieces may be selected as desired depending on the type of vehicle and/or the area of the vehicle in which the bulkhead is to be positioned. The attachment pieces may be formed from any suitable material including metals and plastics. In one embodiment the attachment pieces are metal.

As depicted in the embodiments of FIGS. 1-18, a bulkhead assembly in accordance with the present disclosure may include one or more features to hold a door panel in place and/or prevent a door panel from swinging into one of the cargo or cabin portions of the vehicle. For example, a door may include a locking or latching mechanism (e.g., locks 40 and 80). A locking/latching mechanism is not critical, not limited in any manner, and may be selected as desired for a particular purpose or intended use. The locking/latching member may have, for example, a latch (not shown) adapted to communicate with a slot or stop (not shown) on one of the first or second panels.

Additionally, a bulkhead assembly in accordance with the present disclosure may include a door stop system to prevent the door from swinging in a selected direction, e.g., into the cabin area or into the cargo area. A door stop system is not limited in any manner. As depicted in the embodiments of FIGS. 1-18, a door stop system may be formed by opposing flanges integral with and extending from the door panel and one of the first or second panels. Alternatively, the door stop may be a separate piece, e.g., a metal or plastic strip attached to and extending past an edge of the first or second panels such that the non-hinged edge of the door is adapted to contact the strip and prevents the door from swinging in a selected direction. In another embodiment, a connection bracket, e.g., bracket 34 or 74 may also provide a stop on rotation of a door panel, e.g., 22 or 62, preventing the door from swinging into, for example, the cabin area. In such embodiments, a portion of the connector bracket extends past the edge of a panel, e.g., panels 20 or 60, such that on rotation of a door panel the door panel contacts a portion of the connector bracket preventing the door from swinging into the cabin area.

The panels may include other features as desired for a particular purpose or intended use. For example, the panels may include projections integral with the panel to act as a hook or support for shelves, tools, etc. The panels may also define apertures as to which hooks or brackets or the like may be attached. The panels may also be molded to include ribbed projections and/or recesses for aesthetic and/or structural purposes.

A bulkhead assembly suitable for use in a vehicle has been described with reference to the present specific embodiments. Modifications and alterations may occur to others upon reading and understanding the preceding detailed description. It is intended that a bulkhead assembly be construed as including all such modifications and alterations insofar as they come within the scope of the appended claims or the equivalents thereof.

The invention claimed is:

1. A bulkhead for a vehicle having a first side and a second side, the bulkhead comprising:
 a first panel for positioning proximate to the first side of the vehicle;
 a second panel for positioning proximate to the second side of the vehicle; and
 a door panel disposed between and hingedly attached to one of the first and second panels,
 wherein said first, second, and door panels are formed from a polymer material and
 at least one of the first and second panels defines a cavity having a width sufficient to accommodate a seat back when the seat back is moved into a reclined position.

2. The bulkhead according to claim 1, wherein the first panel includes a cavity having a width sufficient to accommodate a seat back when the seat back is moved into a reclined position.

3. The bulkhead according to claim 2, wherein the first panel includes a lower vertical portion, a first edge proximate the first side of the vehicle, a second edge opposite the first edge, and a marginal portion having a marginal width near each of the edges of the first panel, the cavity being defined by an upper portion positioned between the marginal portions of said first panel and above and longitudinally rearward of the lower vertical portion.

4. The bulkhead according to claim 3, wherein the cavity is defined by an angled portion integral with and adjacent the lower vertical portion, and an upper vertical portion integral with the angled portion, each of the angled portions and the upper vertical being positioned between the marginal portions and longitudinally rearward of the lower vertical portion.

5. The bulkhead of claim 1, wherein at least one of the first panel, the second panel, and the door panel defines a cut-out window area.

6. A bulkhead for a vehicle having a first side and a second side, the bulkhead comprising:
 a first panel for positioning proximate and substantially perpendicular to the first side of the vehicle;
 a second panel for positioning proximate and substantially perpendicular to the second side of the vehicle; and
 a door panel hingedly connected to the first panel,
 wherein each of the first, second, and door panels is formed from a polymer material and
 at least one of said first, second, and door panels defines a cut-out window area.

7. The bulkhead according to claim 6, wherein the window area is covered by a covering formed from a mesh screen.

8. The bulkhead according to claim 6, wherein the window area is covered by a covering formed from a substantially clear plastic sheet.

9. The bulkhead according to claim 6, wherein the first panel includes a cavity having a width sufficient to accommodate a seat back when the seat back is moved into a reclined position.

10. The bulkhead according to claim 9, wherein said first panel includes a lower vertical portion, a first edge adjacent the first side of the vehicle, a second edge opposite the first edge, and a marginal portion having a marginal width near each of the edges; the cavity being defined by an upper portion positioned between the marginal portions and above and longitudinally rearward of the lower vertical portion.

11. The bulkhead according to claim 10, wherein the cavity is defined by an angled portion adjacent the lower vertical portion, and an upper vertical portion adjacent the angled portion, each of the angled portion and the vertical upper portion being positioned between said marginal portions and longitudinally rearward of said lower vertical portion.

12. The bulkhead according to claim 9, wherein, in a fully opened position, said door panel defines an angle of at least about 90° relative to a fully closed position.

13. The bulkhead according to claim 9, wherein, in a fully opened position, said door panel defines an angle of at least about 115° relative to a fully closed position.

14. The bulkhead according to claim 6, wherein
 i) the second panel comprises an edge disposed toward the longitudinal center line of the vehicle, a surface and a first flange, the first flange extending from the surface of the second panel and substantially perpendicular to the edge of the second panel; and
 ii) the door panel comprises a non-hinged edge, a surface oriented opposite to the surface of the second panel, and a second flange, the second flange extending from the surface of the door panel and substantially perpendicular to the non-hinged edge of the door panel, wherein the first and second flanges are positioned in an opposing relationship such that the flanges may be moved into engaging contact with one another to prevent the door panel from being moved beyond a plane of the second panel into the cabin area of the vehicle.

15. A bulkhead assembly for a vehicle having a first side, a second side, and a seat with a moveable seat back and a seat back width, the bulkhead comprising:
 a first panel for positioning proximate and substantially perpendicular to the first side of the vehicle;
 a second panel for positioning proximate and substantially perpendicular to the second side of the vehicle, the second panel lying substantially in the same vertical and horizontal planes as the first panel; and
 a door hingedly attached to one of the first and second panels,
 wherein each of said first, second, and door panels is formed from a polymer material, and the first panel defines a cavity extending away from the seat and having a width to accommodate the seat back when the seat back is moved into a reclined position.

16. The bulkhead assembly accordingly to claim 15, wherein the polymer material is a foamed polymer.

17. The bulkhead assembly according to claim 15, wherein at least one of the first, second, and door panels defines a cut-out window area.

18. The bulkhead assembly according to claim 17, wherein the window area is covered by a mesh screen.

19. The bulkhead assembly according to claim 17, wherein the window area is covered by a substantially clear polymer sheet.

20. The bulkhead assembly according to claim 15, wherein the door panel is hingedly attached to the first panel.

21. The bulkhead assembly according to claim 20, wherein the door when in a fully opened position defines an angle of at least about 90° relative to a closed position.

22. The bulkhead assembly according to claim 20, wherein the door when in a fully opened position defines an angle of at least about 115° relative to a closed position.

23. The bulkhead assembly according to claim 15, wherein at least one of the door and the second panel includes a support member attached thereto.

24. The bulkhead assembly according to claim 15, wherein i) the second panel comprises an edge disposed adjacent the door panel, a first surface oriented in a first front direction, and a first flange, the first flange extending from the first surface of the second panel and substantially perpendicular to the edge of the second panel and
ii) the door panel comprises a non-hinged edge, a second surface oriented in a second direction opposite the first direction, and a second flange, the second flange extending from the second surface of the door and substantially perpendicular to the non-hinged edge of the door panel, wherein the first and second flanges are positioned in an opposing relationship such that the flanges are movable into engaging contact with one another to prevent the door panel from being moved beyond a plane of the second panel.

25. The bulkhead assembly according to claim 15, wherein the first panel includes a vertical lower portion, a first edge, a second edge opposite the first edge, and a marginal portion having a marginal width near each of the edges; the cavity being defined by an upper portion positioned between the marginal portions and above and longitudinally rearward of the lower vertical portion.

26. The bulkhead assembly according to claim 25, wherein the cavity is defined by an angled portion adjacent the lower vertical portion and an upper vertical portion adjacent the angled portion, each of the angled portion and the upper vertical portion being positioned between the marginal portions and longitudinally rearward of the lower vertical portion.

27. A bulkhead for a vehicle having a first side and a second side, the bulkhead comprising:
 a first panel for positioning proximate to the first side of the vehicle;
 a second panel for positioning proximate to the second side of the vehicle; and
 a door panel disposed between and hingedly attached to one of the first and second panels,
 wherein at least one of the first and second panels defines a cavity having a width sufficient to accommodate a seat back when the seat back is moved into a reclined position.

28. The bulkhead according to claim 27, wherein at least one of said first, second and door panels defines a cut-out window.

29. The bulkhead according to claim 27 wherein at least one of said first, second and door panels is formed from a polymer material.

30. The bulkhead according to claim 29 wherein the polymer material is a foamed polymer.

* * * * *